United States Patent
Youn

(10) Patent No.: US 8,218,653 B2
(45) Date of Patent: Jul. 10, 2012

(54) LOSSY FRAME MEMORY COMPRESSION USING INTRA REFRESH

(75) Inventor: Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1046 days.

(21) Appl. No.: 12/080,128

(22) Filed: Mar. 31, 2008

(65) Prior Publication Data

US 2009/0245391 A1    Oct. 1, 2009

(51) Int. Cl.
   *H04N 7/12* (2006.01)
(52) U.S. Cl. .................................. 375/240.27
(58) Field of Classification Search ............................... 375/240.01–240.03, 240.12, 240.22, 240.27
   See application file for complete search history.

(56) References Cited

U.S. PATENT DOCUMENTS

| | | | |
|---|---|---|---|
| 5,376,968 A | 12/1994 | Wu et al. | |
| 5,426,463 A | 6/1995 | Reininger et al. | |
| 5,453,787 A | 9/1995 | Hancock et al. | |
| 6,236,760 B1 | 5/2001 | Bagni et al. | |
| 6,721,455 B1 | 4/2004 | Gourdol | |
| 6,823,015 B2 | 11/2004 | Hall et al. | |
| 6,842,484 B2 * | 1/2005 | Gandhi et al. | 375/240.24 |
| 7,551,799 B2 * | 6/2009 | Rai et al. | 382/275 |

\* cited by examiner

*Primary Examiner* — Frank Duong
(74) *Attorney, Agent, or Firm* — Blakely, Sokoloff, Taylor & Zafman LLP

(57) ABSTRACT

Pixel data is compressed using a combination of variable and fixed quantization for luminance data. The luminance is compared to the result of variable quantization and to the result of the fixed quantization to compute a variable noise and a fixed noise. The result of the variable quantization is selected if the variable noise is less than the fixed noise, otherwise the fixed quantization result is selected if the fixed noise is less than the variable noise. The selected result is transferred to a frame memory. In another aspect of the invention, an intra mode coding decision is forced if the noise corresponding to the selected result exceeds a threshold.

15 Claims, 19 Drawing Sheets

Mode 5:

Mode 6:

Mode 7:

LOSSY FRAME MEMORY COMPRESSION USING INTRA REFRESH

FIELD OF THE INVENTION

This invention relates generally to data compression, and more particularly to video signal processing.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright © 2008, Sony Electronics Inc., All Rights Reserved.

BACKGROUND

In most video codec architectures, separate hardware or software on a processor implements the encoder core, and the frame memory is located outside of the encoder core. Generally, external memory implements the frame memory. As a result, an external bus transfers video data decoded in the local decoder loop inside the encoder core between the encoder core and the frame memory.

Transferring a large amount of data over the external bus between the encoder core and frame memory is costly. In the case of high definition video, using a frame resolution of 1448×1088 at thirty frames per second, the load on the external bus exceeds 400 megabytes per second. If the video compression utilizes bi-predictive pictures, the potential data transfer rate exceeds 800 megabytes per second.

Because of these high rates of data transfer, a large amount of costly frame memory is required to support the encoder. Additionally, the high data transfer rate across the external bus produces a great deal of heat and consumes a great deal of power.

Video encoding works best when reference memory segments pixel data into independent blocks allowing random access to the pixel data. Performance requirements determine the size of the block. One embodiment of the invention processes the luminance (Y) and chrominance (U and V) of each block differently according to different characteristics of the two components. The luminance is compressed mainly using prediction from neighboring pixels to reduce the dynamic range of the pixel data. The prediction requires preserving the value of first pixel in the compressed output. Otherwise, the prediction will generate some drift in other predicted pixel due to the inaccuracy of the reference value.

SUMMARY

Pixel data is compressed using a combination of variable and fixed quantization for luminance data. The luminance is compared to the result of variable quantization and to the result of the fixed quantization to compute a variable noise and a fixed noise. The result of the variable quantization is selected if the variable noise is less than the fixed noise, otherwise the fixed quantization result is selected if the fixed noise is less than the variable noise. The selected result is transferred to a frame memory. In another aspect of the invention, an intra mode coding decision is forced if the noise corresponding to the selected result exceeds a threshold.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Pixel data is compressed by half using a combination of variable and fixed quantization for luminance data. The luminance is compared to the result of variable quantization and to the result of the fixed quantization to compute a variable noise and a fixed noise. The result of the variable quantization is selected if the variable noise is less than the fixed noise, otherwise the fixed quantization result is selected if the fixed noise is less than the variable noise. The selected result is transferred to a frame memory. In another aspect of the invention, an intra mode coding decision is forced if the noise corresponding to the selected result exceeds a threshold.

Figure 1:
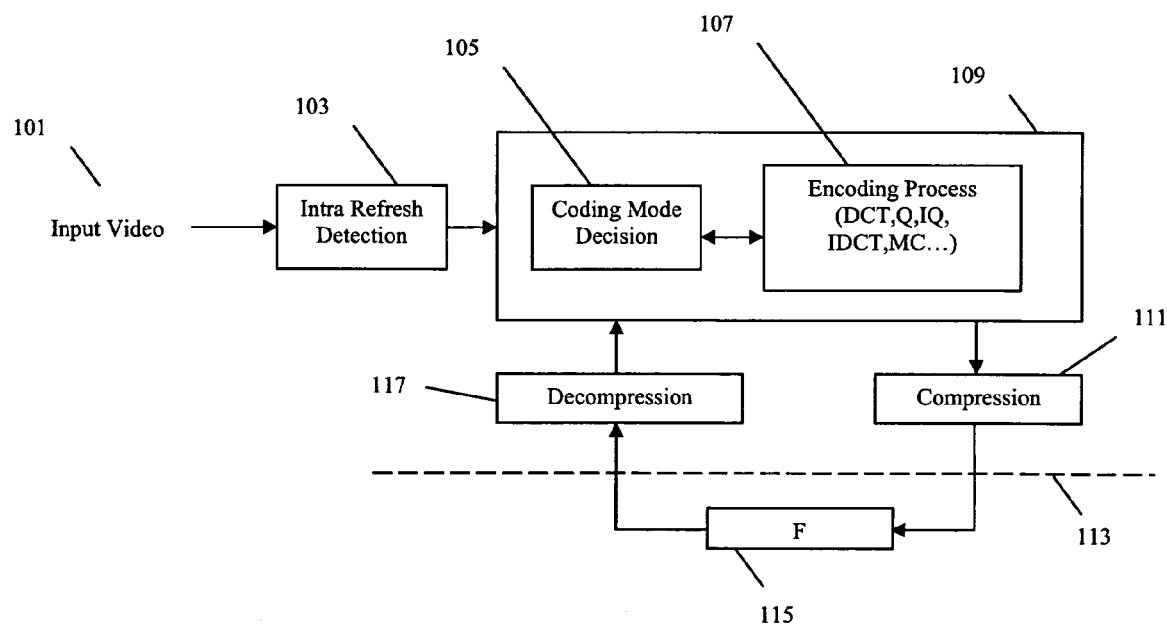
FIG. 1 is a diagram illustrating an overview of the operation of an embodiment of an encoder according to the invention.

Beginning with an overview of the operation of the invention, FIG. 1 illustrates one embodiment of lossy frame memory compression. Intra refresh detection module 103 receives input video 101. Intra refresh detection module 103 analyzes input video 101 and determines if it is appropriate to force local encoder core 109 into intra mode, as discussed below in conjunction with FIG. 18. After processing by intra refresh detection module 103, encoder core 109 receives input video 101.

Local encoder 109 includes coding mode decision module 105 and encoding process module 107. Encoder 109 transmits one or more portions of input video 101 to compression block 111, which performs compression upon the one or more portions of input video 101. After the one or more portion of input video 101 is compressed, encoder 109 transmits the portion over external bus 113 into frame memory 115.

When encoder 109 requires the compressed portion of input video 101, frame memory 115 transmits the compressed portion over external bus 113 into decompression module 117. Decompression module 117 decompresses the compressed portion of input video 101 and transmits it back to local encoder core 109 for further processing.

In one embodiment of the invention, input video 101 arrives as macroblocks. In one embodiment, portions of input video 101 pass through compression module 111 as four by four pixel blocks as described below in conjunction with FIGS. 6 and 7. Each four by four pixel block contains data describing the luminance of the four by four pixel block and data describing the two chrominance signals of the pixel block.

Figure 2:
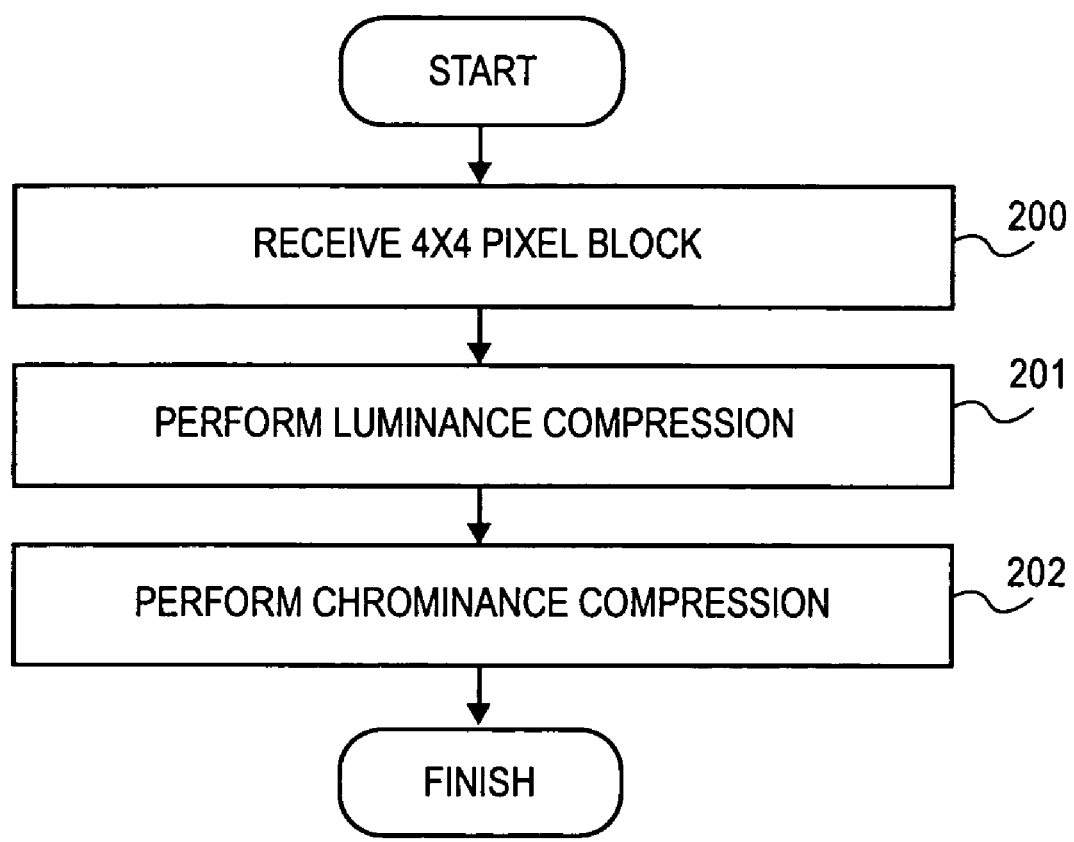
FIG. 2 is a flow diagram illustrating a method of performing lossy frame memory compression to be performed by a computer according to an embodiment of the invention.

In one embodiment, the compression module 111 of FIG. 1 operates as illustrated by the flow diagram of FIG. 2. At block 200, the method receives pixel data formatted as a four by four pixel block. At block 201, the luminance data contained within the four by four pixel block received at block 200 is compressed. At block 202, the chrominance data contained within the four by four pixel block received at block 200 is compressed.

Figure 3:
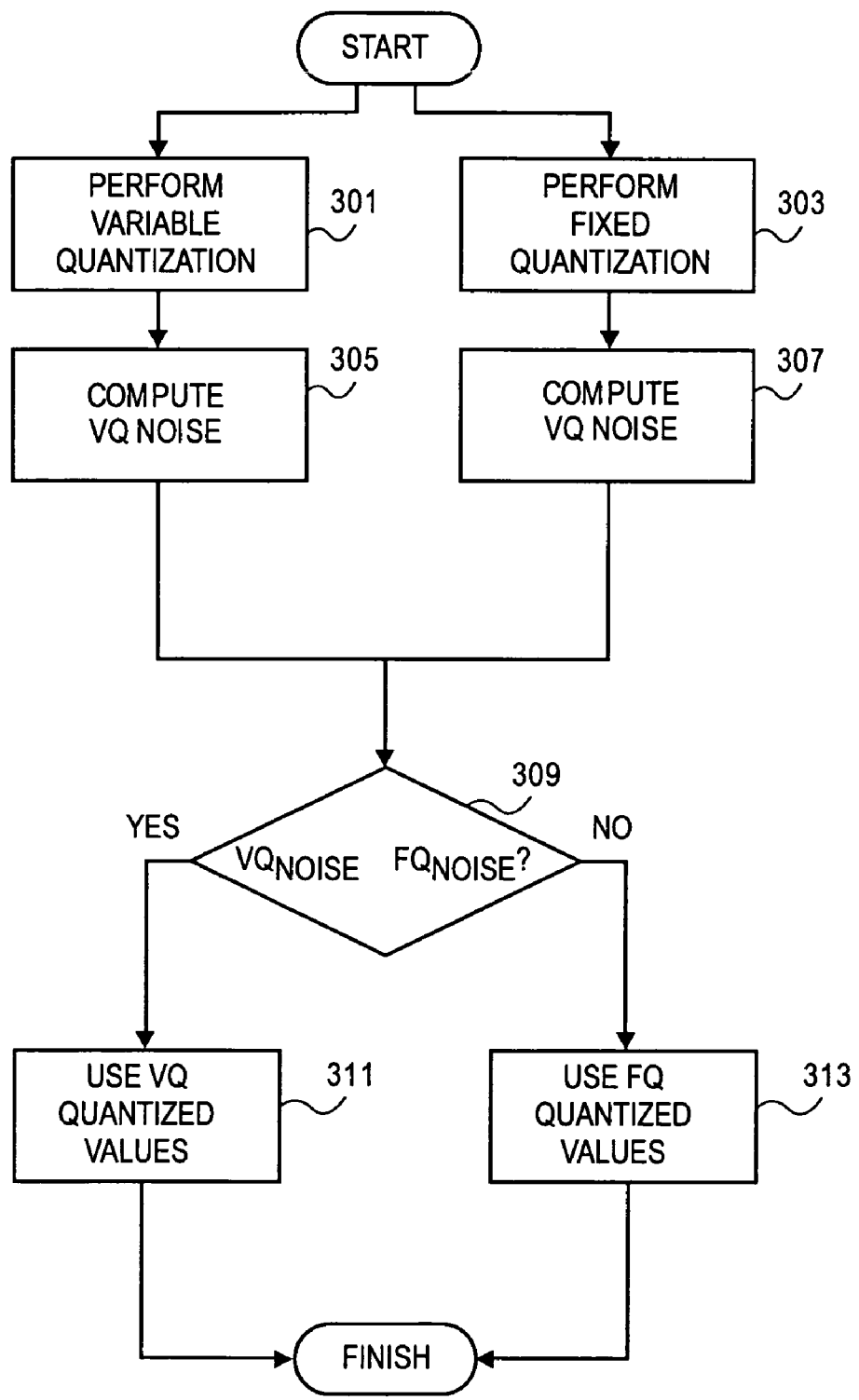
FIG. 3 is a flow diagram illustrating a method of selecting a quantization, the method to be performed by a computer according to an embodiment of the invention.

FIG. 3 illustrates one embodiment of luminance compression block 201. At block 301, the method variably quantizes the four by four pixel block received at block 200. At block 305, the method computes noise resulting from the variable quantization. At block 303, the method fixedly quantizes the four by four pixel block received at block 200. At block 307, the method computes noise resulting from the fixed quantization by comparing the mean square error of the original and compressed pixels.

At block 309, the luminance compression technique illustrated herein compares the noise resulting from variable quantization as determined at block 305 with the noise resulting from fixed quantization as determined at block 307. In order to optimize the visual quality of the compressed pixel block, variable quantization is chosen in lieu of fixed quantization at block 309 if the noise resulting from variable quantization is less than or equal to the noise resulting from fixed quantization. At block 311, the method selects variably quantized values of the four by four pixel block. Alternatively, at block 313, the values resulting from the fixed quantization of the four by four pixel block performed by block 303 are used.

Figure 4:
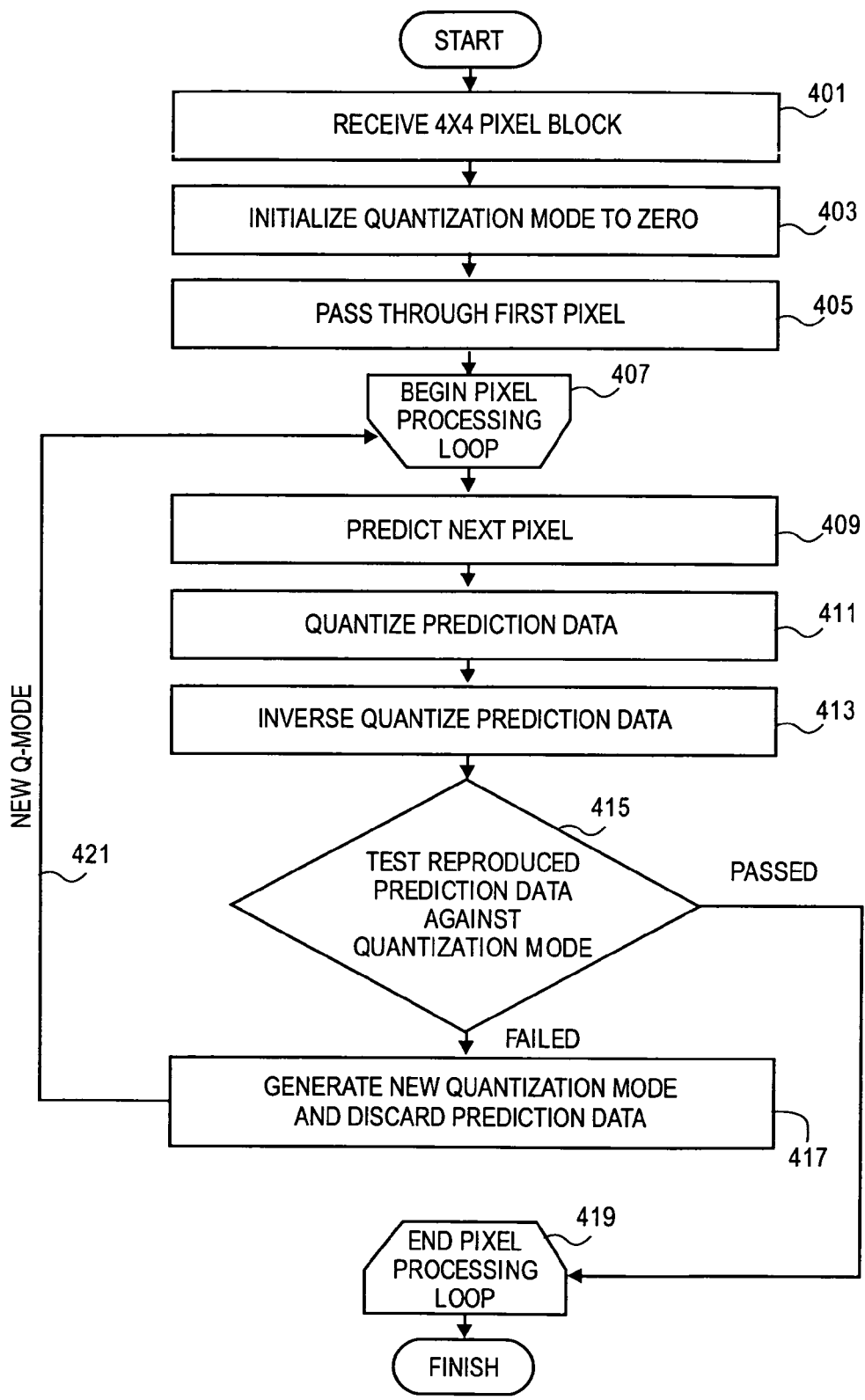
FIG. 4 is a flow diagram illustrating a method of variably quantizing pixel data to be performed by a computer according to an embodiment of the invention.

FIG. 4 illustrates one embodiment of variable quantization 301. At block 401, the method receives a four by four pixel block. In this embodiment, the pixel block received at block 401 is the same as the pixel block received at block 200 in FIG. 2. One embodiment of the invention uses a quantization mode to control the variable quantization of pixel data. Increasing the quantization mode enhances the resulting compression of disparate data at the cost of introducing additional noise. At block 403, the method initializes the quantization mode to zero. At block 405, the method passes the first pixel of the four by four pixel block received at block 401 through the luminance compression illustrated in FIG. 4 unchanged. By leaving the first pixel unaltered, decompression 117 more accurately reconstructs the pixel block from the quantized pixel data.

Figure 5A:
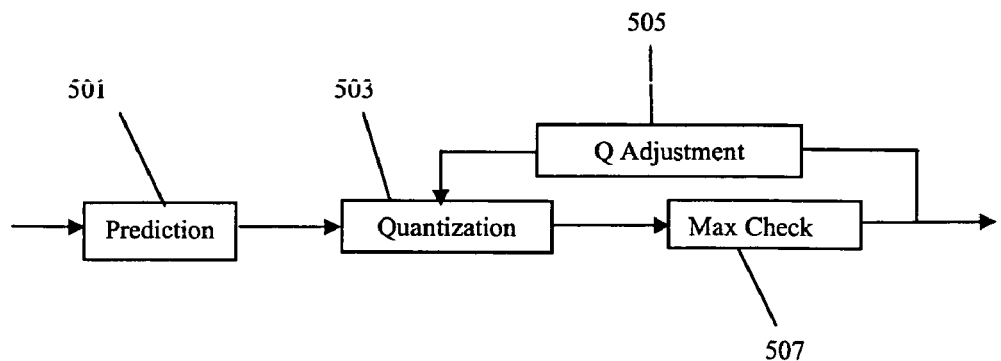
FIGS. 5A and 5B are diagrams illustrating two methods of compressing data to be performed by a computer according to an embodiment of the invention.
Figure 5B:
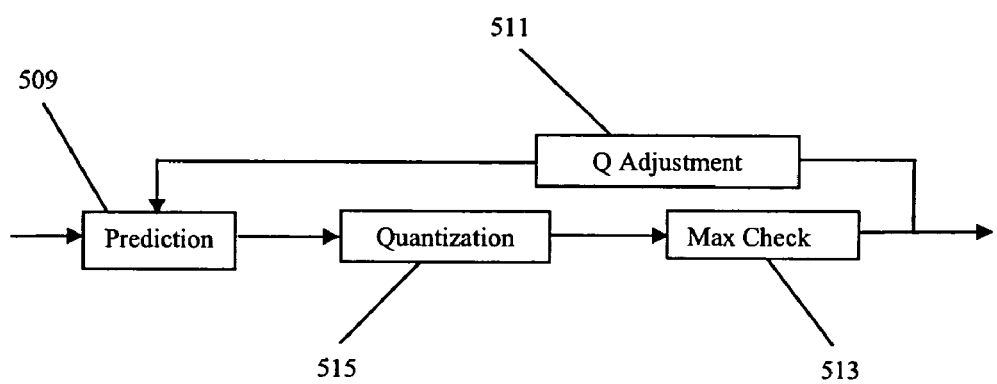

At block 407, the pixel processing loop begins processing the pixels remaining in the pixel block. FIG. 5A illustrates one embodiment of pixel processing loop 407. This embodiment increases temporal efficiency but incurs some drift error. FIG. 5B illustrates another embodiment of pixel processing loop 407. FIG. 4 illustrates a pixel processing loop 407 using the embodiment that FIG. 5B illustrates. Pixel processing loop implementations are discussed in greater detail below in conjunction with FIGS. 5A and 5B.

At block 409, the method predicts the next pixel in the block according to a prediction process discussed below in conjunction with FIGS. 6 and 7. At block 411, the method quantizes predicted pixel data from block 409 using the current quantization mode. At block 413, the quantized predicted pixel data from block 411 is inversely quantized using the current quantization mode.

At block 415, the method tests the reproduced predicted pixel data from block 413 against the current quantization mode to determine if the method should change the current quantization mode. In one embodiment of block 415, the set of predicted pixel data are tested to determine the maximum value of the set and the quantization mode is adjusted according to the following criteria:

If (max of prediction<=7)$n$=0→no quantization (1)

If (7<max of prediction<=15)$n$=1→quantization by 2 (2)

If (15<max of prediction<=31)$n$=2→quantization by 4 (3)

If (31<max of prediction<=63)$n$=3→quantization by 8 (4)

If (63<max of prediction<=127)$n$=4→quantization by 16 (5)

If (max of prediction>127)$n$=5→quantization by 32 (6)

One embodiment of the invention allocates three bits of storage for each predicted pixel data as described in greater detail below in conjunction with FIG. 8. It will be appreciated by those skilled in the art that values less than or equal 7 require no more than 3 bits of storage to represent in a binary fashion. If the largest value in the reproduced predicted pixel data would require more than three bits to store at the current quantization mode, the current quantization mode is increased. As noted above, the luminance quantization method illustrated in FIG. 4 implements the accurate method quantization technique illustrated in FIG. 5B. Accordingly, in block 417, if the method changes the quantization mode because of the test performed in block 415, the method discards the predicted pixel data accumulated up until this point. In this manner, the method avoids drift error associated with changing quantization modes during a quantization of predicted pixel data.

Following transition 421 back to the beginning of pixel processing loop 407, the loop discards existing prediction data and starts again. Alternatively, if the current quantization mode is adequate to quantize the predicted pixel data computed up until this point by the pixel processing loop illustrated in FIG. 4, the method repeats the loop for the pixels remaining in the pixel block.

FIG. 5A illustrates one embodiment of pixel processing loop 407. Prediction 501 performs pixel prediction on the original pixels of the block, not based on the previous predicted pixel data, so drift error occurs. However, this reduces the computational overhead associated with FIG. 4's block 417 discarding of previously predicted pixel data in order to reduce drift error. Quantization 503 quantizes the predicted pixel data generated by prediction 501 and tests the quantized predicted pixel data against the current quantization mode. However, if adjustment 505 changes the current quantization mode, pixel processing loop 407 retains existing predicted pixel data.

Figure 6:
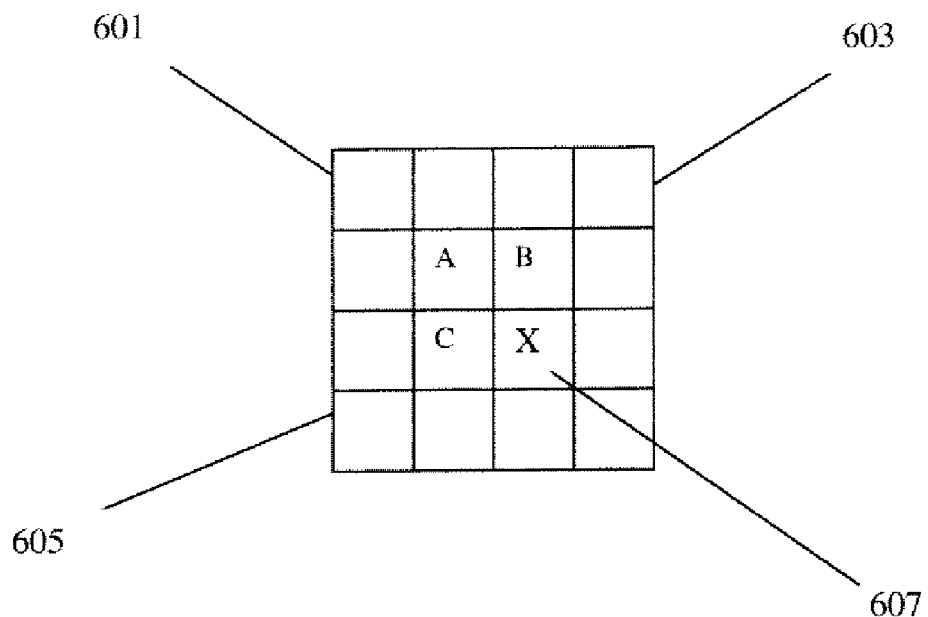
FIG. 6 is a diagram illustrating a pixel prediction of the operation of an embodiment of an encoder according to the invention.
Figure 7:
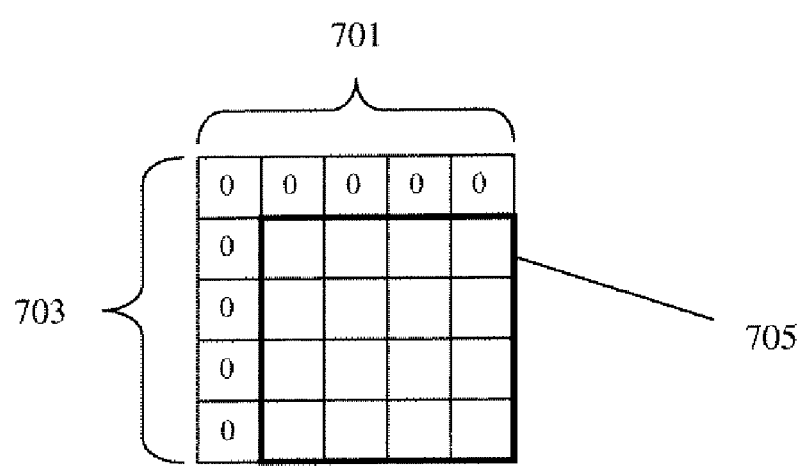
FIG. 7 is a diagram illustrating a technique for reducing external prediction dependencies when performing pixel predictions according to an embodiment of the invention.

In one embodiment of the pixel processing loop illustrated in FIG. 4, predict next pixel 409 is implemented in a manner illustrated in FIGS. 6 and 7 and may be described using the following equations, where Px is the prediction of pixel X, and A, B, and C are neighboring pixels:

$$Px=\min(B,C) \text{ if } A>=\max(B,C) \quad (7)$$

$$Px=\max(B,C) \text{ if } A<\min(B,C) \quad (8)$$

$$Px=B+C-A \text{ otherwise} \quad (9)$$

In FIG. 6, pixels 601, 603, and 605 correspond to neighboring pixels A, B, and C in equations 7, 8 and 9. Pixel 607 refers to pixel X, which is the pixel that predict next pixel 409 will predict based on the values of pixels A, B, C according to equations 7, 8, and 9.

In one embodiment of the pixel processing loop illustrated in FIG. 4, the pixel prediction at block 409 is implemented to avoid encoding dependencies of the pixel block on surrounding pixels outside the block. To accomplish this, the pixel prediction at block 409 makes assumptions about the neighboring pixels above and to the left of the pixel block being predicted. In FIG. 7, block 705 corresponds to the four by four block of, which corresponds to the four by four pixel block illustrated in FIG. 6 and processed by the pixel processing loop illustrated in FIG. 4. Pixels 701 and 703 are the borders of block 705. By assuming that neighboring pixels 701 and 703 contain the value of zero during prediction and reconstruction, the pixel block 705 may be reconstructed at random.

Figure 8:
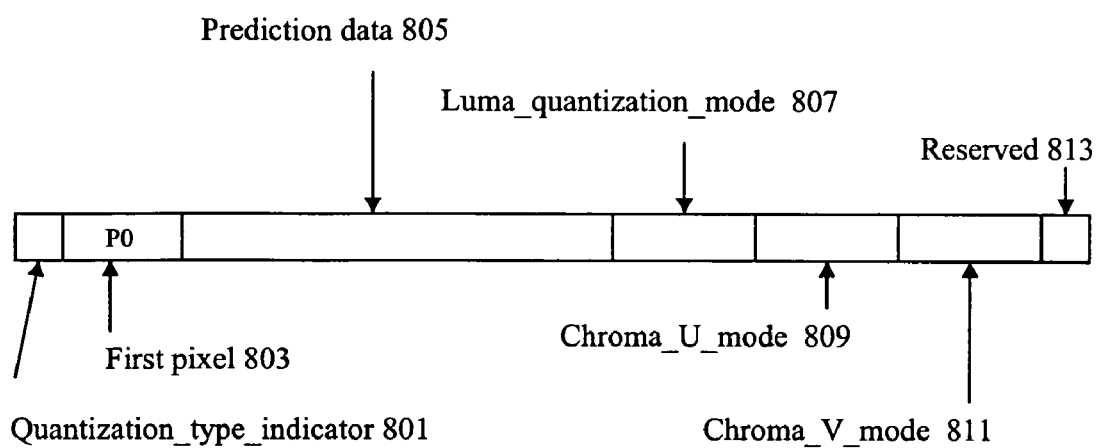
FIG. 8 is a diagram illustrating a variable quantization bit packing arrangement according to an embodiment of the invention.

In one embodiment of the quantization and selection of quantization illustrated in FIG. 3, results of the variable quantization values selected at block 311 are bit packed as illustrated by FIG. 8. Quantization_type_indicator 801 allocates one bit of storage for indicating to a video decoder that the predicted pixel data contained in the bit packed structure illustrated in FIG. 8 is variably quantized. First pixel 803 allocates eight bits of storage for the first pixel in a four by four pixel block, as illustrated in FIG. 4 at block 405, where the first pixel of the pixel block passes through the compression without loss of data. Prediction data 805 allocates 45 bits for storing the predicted pixel data corresponding to the remaining fifteen pixels in the four by four pixel block. As indicated in the discussion of quantization mode testing in FIG. 4 at block 415 and 417, three bits correspond to the prediction data of each of the remaining fifteen pixels in the four by four block. Luma_quantization_mode 807 allocates three bits for storing the quantization mode used to variably quantize the predicted pixel data. Chroma_U_mode 809 and Chroma_V_mode 811 each allocate three bits for storing the compression modes of the chrominance U and chrominance Y signals, which are described below in greater detail in conjunction with FIGS. 13-16. Reserved 813 allocates one bit for future use.

Figure 9:
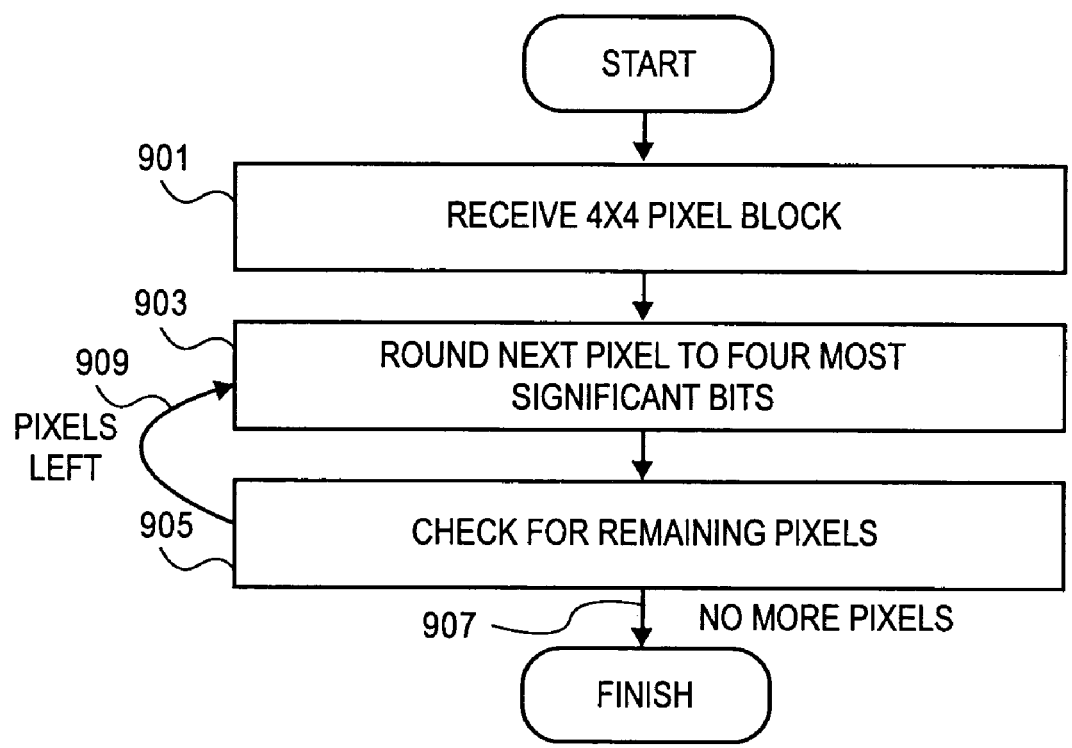
FIG. 9 is a flow diagram illustrating a fixed quantization method of quantizing pixel data to be performed by a computer according to an embodiment of the invention.

In one embodiment of quantization and selection of quantization illustrated in FIG. 3, the fixed quantization performed at block 303 operates as illustrated in FIG. 9. At pixel rounding 903, the method rounds the eight bits of data corresponding to each pixel in the four by four pixel block to the four most significant bits, in a manner described below in conjunction with FIG. 9. Loop condition 905 continues pixel rounding 903 until all pixels of pixel block 901 have been processed, at which point fixed quantization completion 907 is reached.

Figure 10:
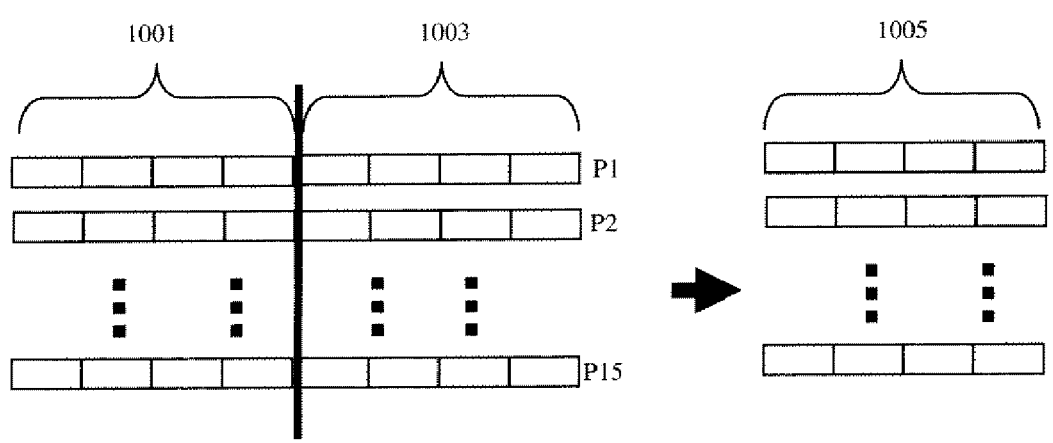
FIG. 10 is a diagram illustrating a fixed quantization of pixel data according to an embodiment of the invention.

In one embodiment of the fixed quantization method illustrated in FIG. 9, pixel rounding 903 is implemented as illustrated in FIG. 10. Most significant bits 1001 and least significant bits 1003 are rounded to most significant bits 1005, which correspond to most significant bits 1001. Certain overhead associated with the compression of the luminance data as described above and the chrominance data as will be described below in conjunction with FIGS. 13-16 must be accommodated within the final results of the lossy frame memory compression illustrated in FIG. 1. For this reason, the pixel data quantized with a fixed quantization technique must be further reduced from four bits per pixel to three bits per pixel.

Figure 11:
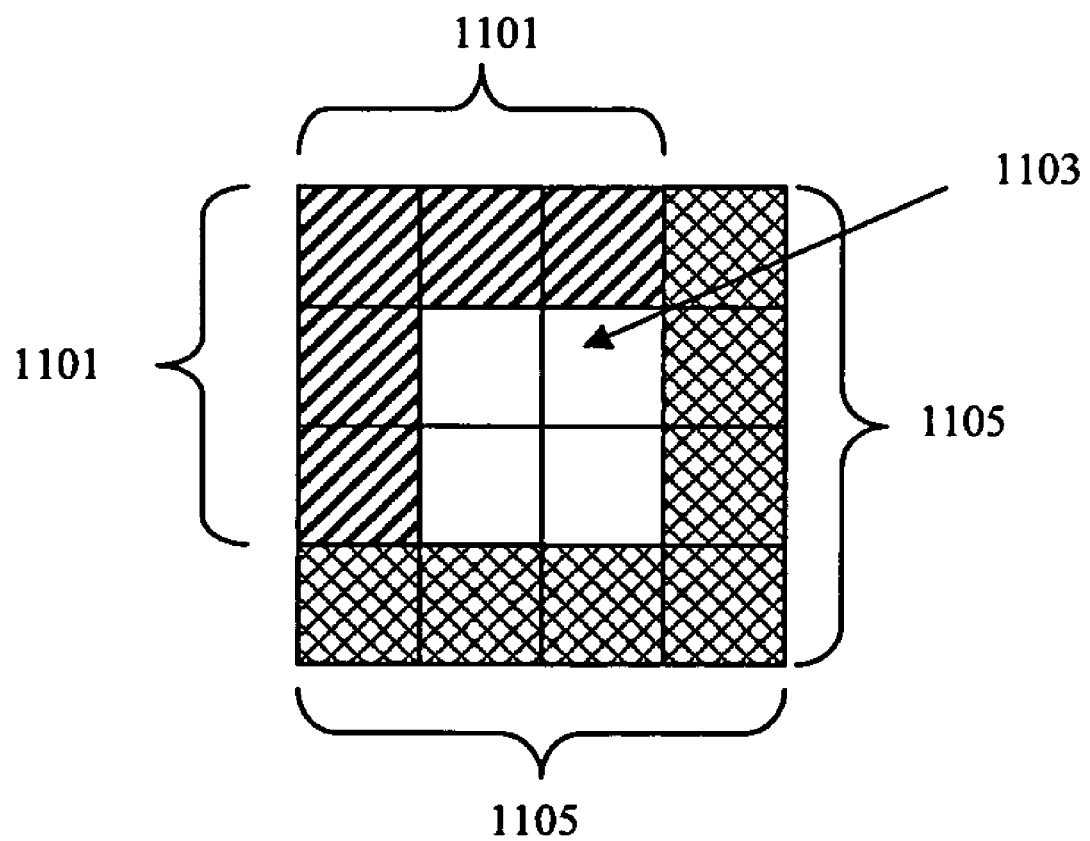
FIG. 11 is a diagram illustrating overhead apportionment of a pixel block quantized with a fixed quantization method according to an embodiment of the invention.

In one embodiment of the quantization and selection of quantization illustrated in FIG. 3, the fixed quantization values selected at block 313 have overhead bits apportioned as illustrated in FIG. 11. Group 1101 refers to upper and left pixels of the four by four pixel blocks. To reduce additional quality loss in the four by four pixel block's boundary, no overhead information is embedded in these pixels. Group 1105 refers to the pixels in the right column and bottom row of the four by four pixel block. In intra prediction, the pixels in group 1105 may be used as predictors by the video decoder. To reduce the quality loss of prediction is applied using the pixels in group 1105, no overhead is embedded in these pixels. Group 1103 refers to the four pixels in the center of the four by four pixel block. Three of these pixels are stored using only three bits, making available three bits for storing overhead associated with the compression of the four by four pixel block.

Figure 12:
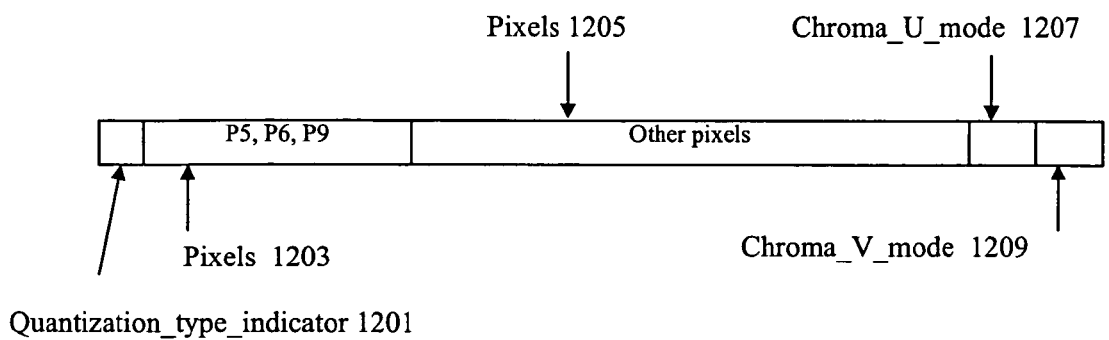
FIG. 12 is a diagram illustrating a fixed quantization bit packing arrangement according to an embodiment of the invention.

In one embodiment of the quantization and selection of quantization illustrated in FIG. 3, the fixed quantized values selected at block 313 are bit packed as illustrated in FIG. 12. Quantization_type_indicator 1201 allocates one bit for indicating to a video decoder that the pixel data contained within pixels 1203 and pixels 1205 are quantized with a fixed quantization technique. Pixels 1203 allocates three bits for each of three pixels, for a total of nine bits. Pixels 1203 correspond to FIG. 11's group 1103 of center pixels used to store overhead. Pixels 1205 allocates four bits for each of the remaining thirteen pixels for a total of fifty-two bits. Chroma_U_mode 1207 and Chroma_U_mode 1209 each allocate one pixel for storing the chrominance compression modes used to compress the chrominance U and V signals, as described below in conjunction with FIGS. 13-16.

Figure 13:
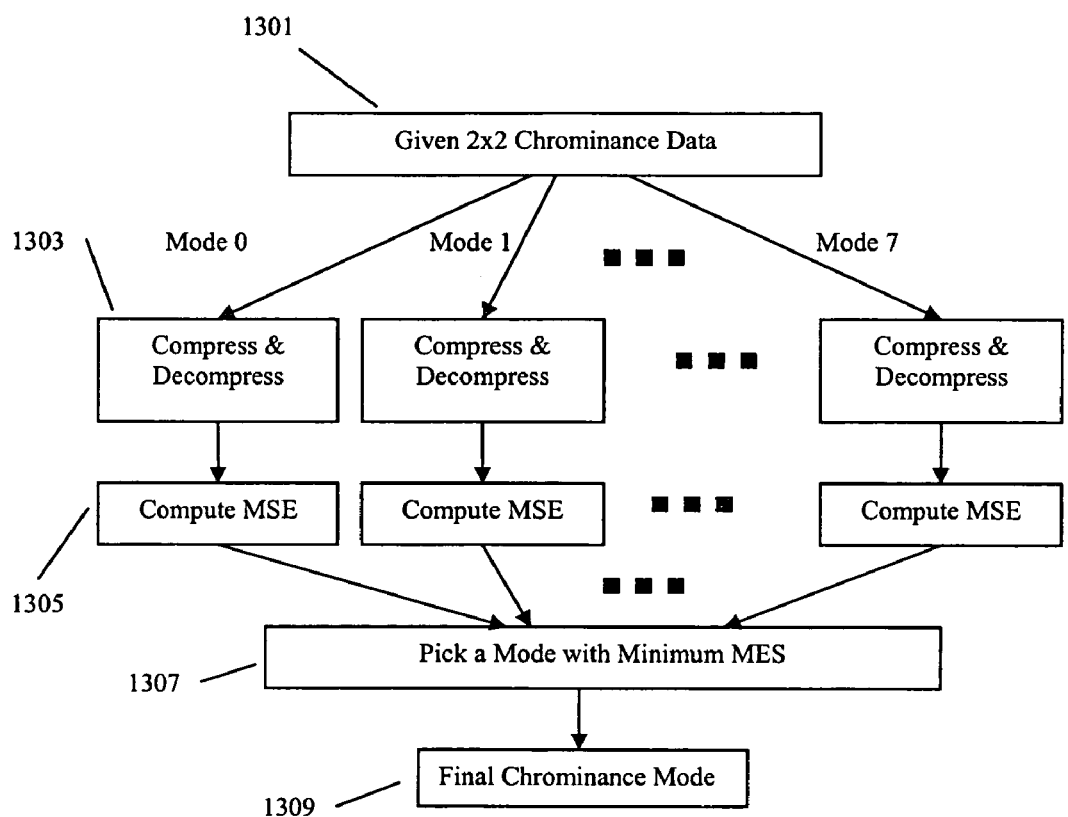
FIG. 13 is a flow diagram illustrating a chrominance quantization method to be performed by a computer according to an embodiment of the invention.

In one embodiment of the lossy frame memory compression illustrated in FIG. 2, the chrominance compression performed at block 202 upon the four by four pixel block received at 200 is implemented as illustrated in FIG. 13. At block 1301, a two by two chrominance data corresponding to the chrominance data of the four by four pixel block received at block 200 is received. At block 1303, the chrominance data is compressed and decompressed according to chrominance compression mode 0. The chrominance data is also compressed with chrominance compression modes 1 through 7. Compression modes 0 through 7 are described further below in conjunction with FIG. 15. At 1305, the mean square error resulting from the compression of the chrominance data by chrominance compression mode 0 at 1303 is computed. Mean square error provides an evaluation of the accuracy of the chrominance compression mode and makes it possible to choose between the eight chrominance compression modes performed. Mean square error is computed in the following equation, where Mx is the mode for which the mean square error is to be computed, P is the uncompressed chrominance data, and D is the uncompressed chrominance data:

$$MSE(Mx) = \sum_{i=0}^{3} (P_i - D_i)^2 \tag{10}$$

At 1307, the chrominance compression mode with the lowest corresponding mean square error is selected for the chrominance data received at 1301 corresponding to the four by four pixel block received at block 200 as illustrated in FIG. 2.

Figure 14:
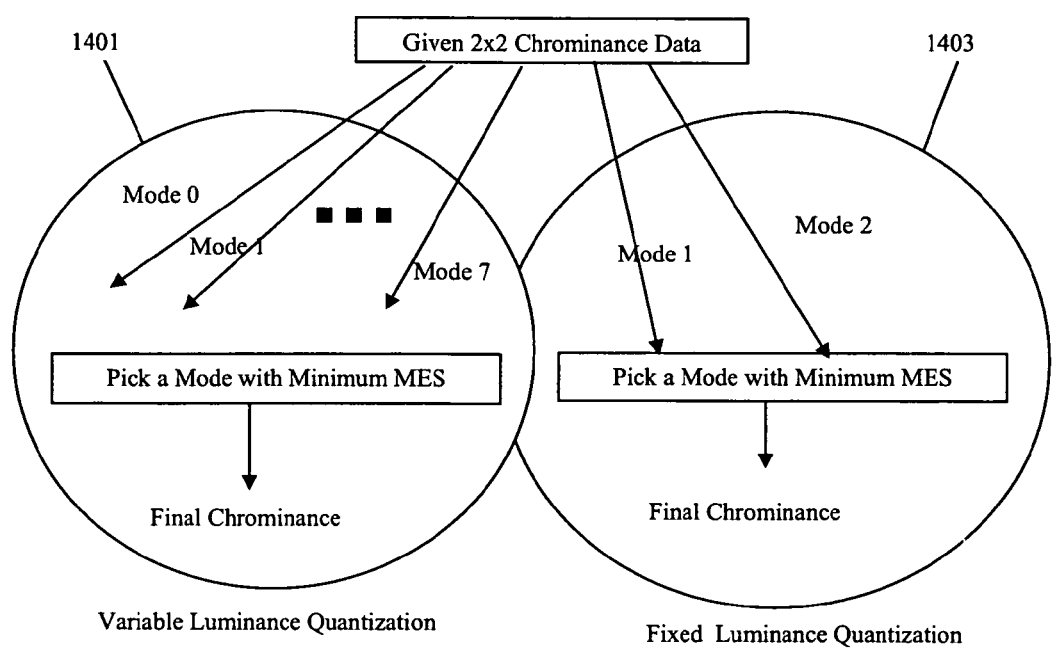
FIG. 14 is a flow diagram illustrating a method of selecting a chrominance quantization method based on a luminance quantization selection to be performed by a computer according to an embodiment of the invention.

In one embodiment of the quantization and selection of quantization illustrated in FIG. 3, different storage requirements for compressed luminance data correspond to different chrominance compression mode availability, as illustrated in FIG. 14. Chrominance compression 1401 corresponds to chrominance compression mode availability when variably quantized values are selected at block 311 in FIG. 3. At 1401, chrominance compression modes 0 through 7 are available and each is applied to the chrominance data as illustrated in FIG. 13. Chrominance compression modes are described below in conjunction with FIG. 15. Since there are eight potential chrominance compression modes, three bits of storage are required for each chrominance signal U and V, since each signal may be compressed using a different chrominance compression mode. Referring back to FIG. 8, a bit packing arrangement used for luminance compression, Chroma_U_mode 809 and Chroma_V_mode 811 both allocate three bits for each chrominance signal U and V. Returning to FIG. 14, chrominance compression 1403 refers to the chrominance compression mode availability when fixed quantized luminance values are selected at block 313 in FIG. 3. At 1403, chrominance compression modes 1 and 2 are available to compress chrominance signals U and V. Chrominance compression at 1403 proceeds in the manner illustrated in FIG. 13, except that compression modes 0 and 3-7 are not computed.

Figure 15:
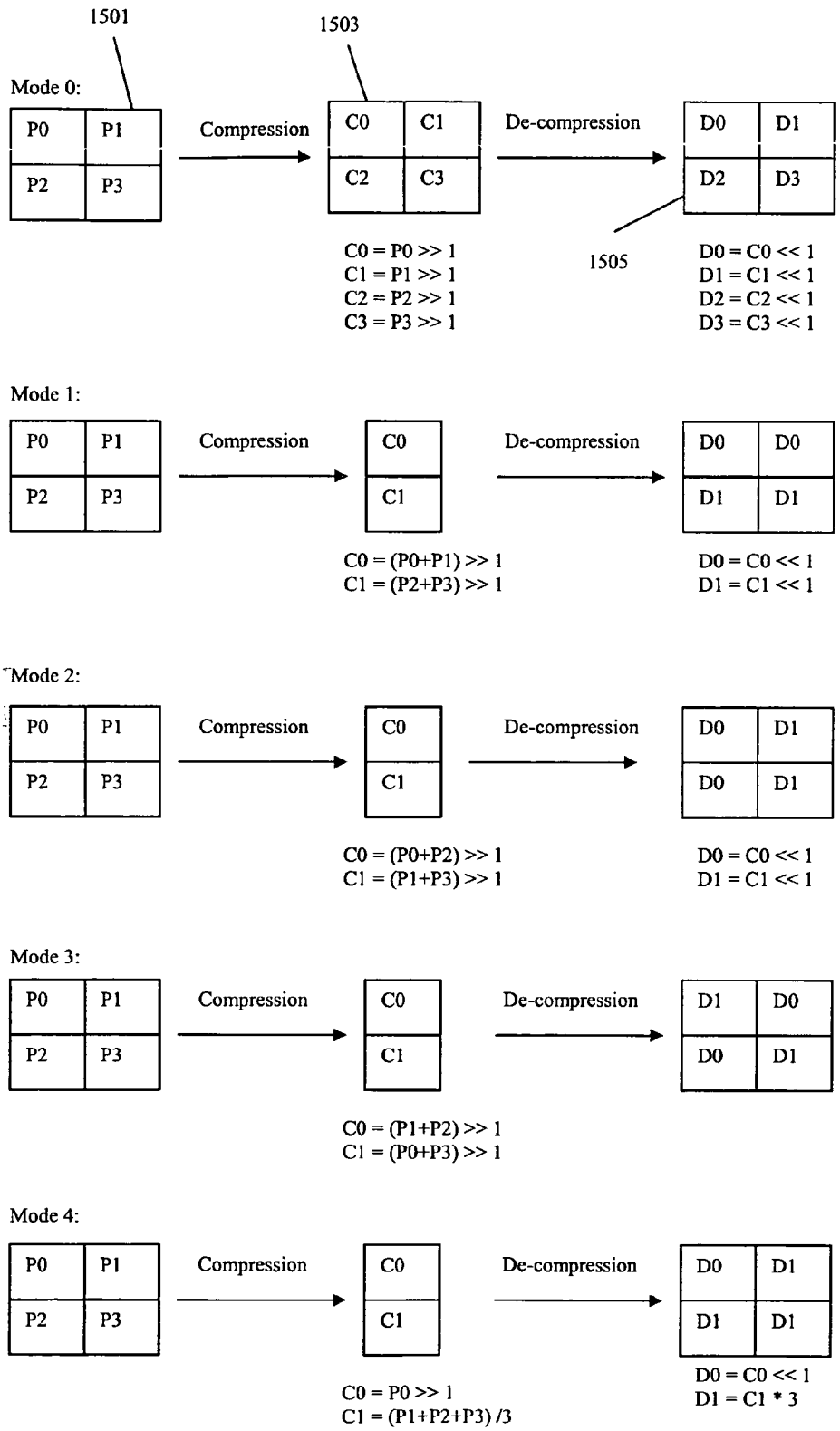
FIG. 15 is a diagram illustrating several chrominance compression and decompression modes according to an embodiment of the invention.
Figure 15:
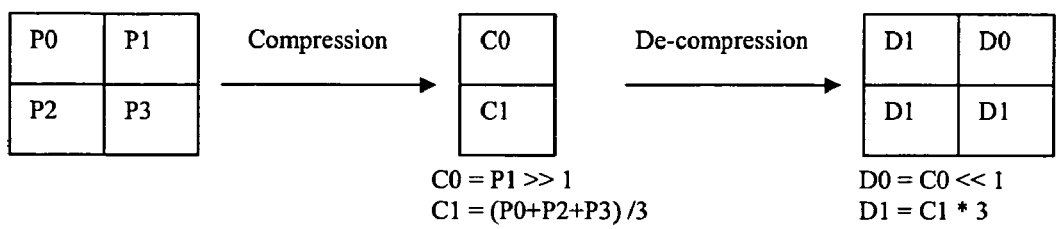
Figure 15:
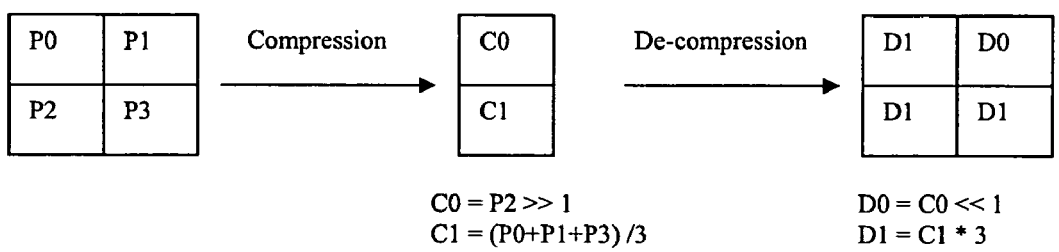
Figure 15:
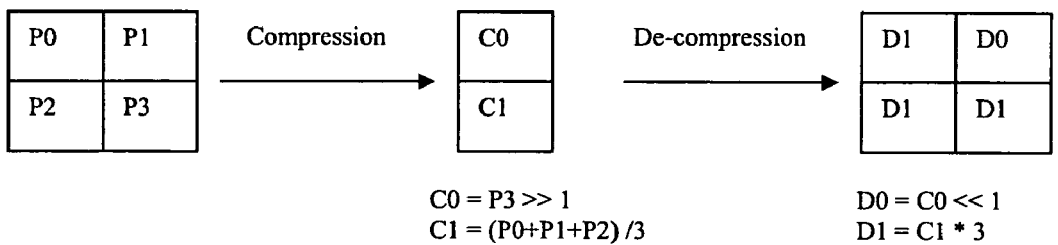

In one embodiment of chrominance compression illustrated in FIG. 13, chrominance compression modes 0 through 7 are implemented as illustrated in FIG. 15. Initial pixel chrominance 1501 refers to the four initial pixel chrominance values, P0 through P3. Compressed values 1503 corresponds to the four values after being compressed. For mode 0, each original value is shifted one bit to the right, resulting in a total four bit savings. The corresponding decompressed values are shown at 1505 after the compressed values have been shifted one bit to the left.

Figure 16:
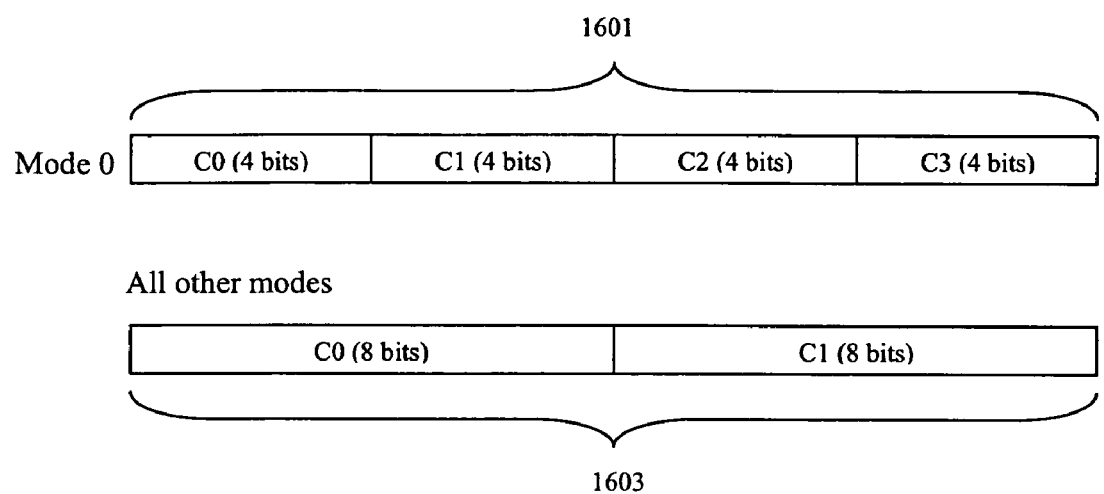
FIG. 16 is a diagram illustrating chrominance compression bit packing arrangements according to an embodiment of the invention.

In one embodiment of chrominance compression illustrated in FIG. 13, bit packing of compressed chrominance data is implemented as illustrated in FIG. 16. Bit packing 1601 refers to a bit packing arrangement used when a chrominance signal is compressed using chrominance compression mode 0. Four bits are allocated for each compressed chrominance data point, C0 through C3. Bit packing 1603 refers to a bit packing arrangement used when chrominance data is compressed using one of the other chrominance compression modes 1 through 8. Compressed chrominance data points 0 and 1 each receive eight bits of storage.

Figure 17A:
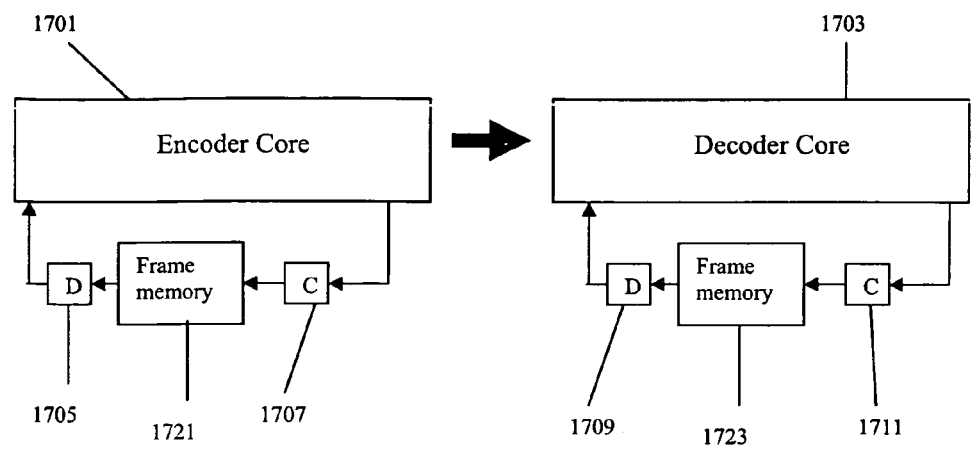
FIG. 17A is a diagram illustrating a encoder and decoder configuration according to an embodiment of the invention.

In one embodiment of lossy frame memory compression illustrated in FIG. 1, video data encoded by encoder core 109 is decoded by a decoder as illustrated in FIG. 17A. Encoder core 1701 corresponds to encoder 109 in FIG. 1. Compression 1707 and decompression 1705 correspond to compression 111 and decompression 117 in FIG. 1. Encoded video data is received by decoder core 1703. Decoder core 1703 is connected to compression 1711 and decompression 1709, which perform a similar function to compression 1707 and decompression 1705. Since cores 1701 and 1703 both compress video data prior to writing it to frame memories 1721 and 1723 and decompress it prior to reuse in encoding or decoding, error associated with compression and decompression is not propagated during the decoding process, since it is compensated for by the corresponding compression 1711 and decompression 1709.

Figure 17B:
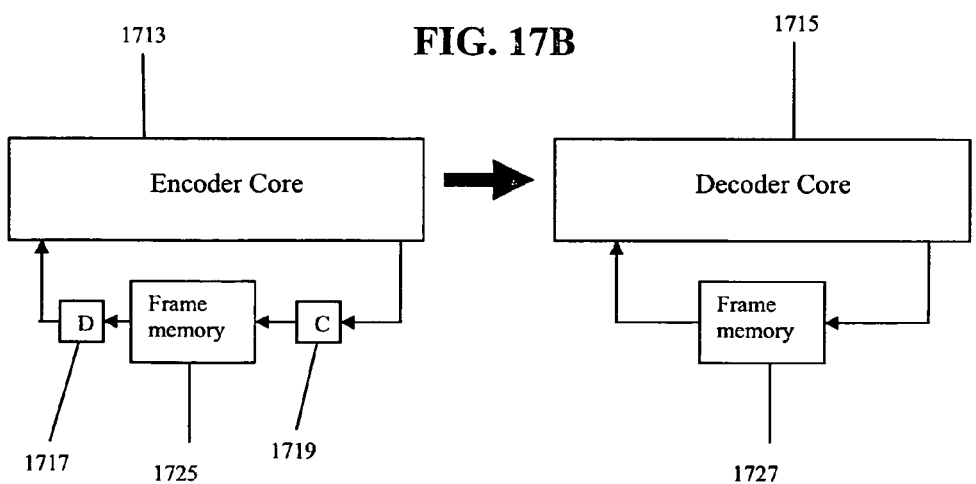
FIG. 17B is a diagram illustrating an alternate encoder and decoder configuration according to an embodiment of the invention.

In an alternative embodiment of lossy frame memory compression illustrated in FIG. 1, video data encoded by encoder core 109 is decoded by a decoder as illustrated in FIG. 17B. Encoder core 1713 corresponds to encoder core 109 in FIG. 1. Frame memory 1725 corresponds to frame memory 115 in FIG. 1. Video encoded by encoder core 1713 is received by decoder core 1715, which does not have a compression and decompression associated with it, only frame memory 1727. Error introduced by compression 1719 and decompression 1717 is not compensated when the encoded video is decoded by decoder core 1715 and will propagate through predictions made by decoder core 1715.

Figure 18:
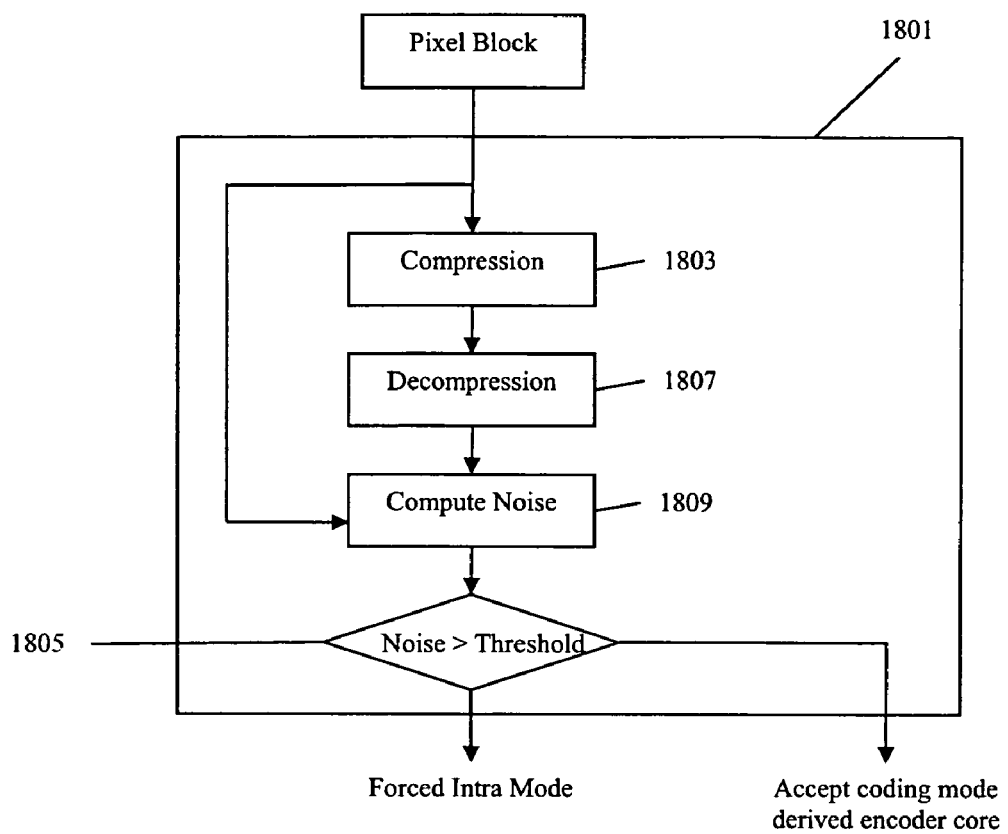
FIG. 18 is a flow diagram of a method of overriding a coding mode decision to be performed by a computer according to an embodiment of the invention.

In one embodiment of the lossy frame memory compression illustrated in FIG. 1, intra refresh detection 103 is implemented as illustrated in FIG. 18. Intra refresh detection 1801 corresponds to intra refresh detection 103 in FIG. 1. Compression 1803 compresses pixel data, decompression 1807 decompresses compressed pixel data, and compute noise 1809 compares the pixel data to the decompressed data to compute a noise value. At 1805, the noise is tested against a threshold value. If the noise exceeds the threshold value, the intra refresh detection illustrated in FIG. 18 forces the encoder illustrated in FIG. 1 at 109 to switch to intra mode. Intra mode is more bandwidth costly, but eliminates prediction error for that frame. If the noise is less than the threshold, at 1805 the encoder core 109 is permitted to make its own decision regarding whether to generate an intra frame.

Since the results of compression 1803 will not be propagated to future frames, the variable quantization of the luminance data performed at compression 1803 is implemented using the temporally optimized variable quantization technique illustrated in FIG. 5A. To further avoid computational expense, the intra refresh detection is performed before the local encoder begins processing the current portion of the input video, so the local encoder is informed of the coding mode override at 1805 before it begins processing the current portion of the input video.

Figure 19:
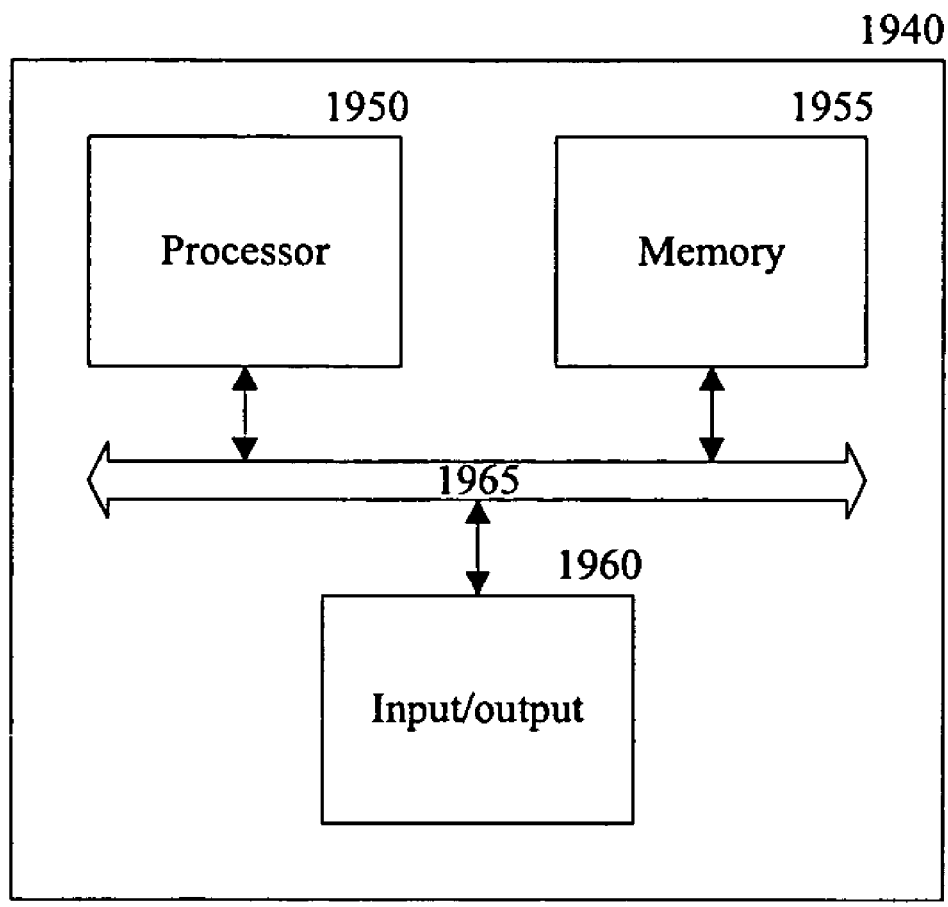
FIG. 19 is a diagram of a computer environment suitable for practicing the invention.

The following description of FIG. 19 is intended to provide an overview of computer hardware and other operating components suitable for implementing the invention, but is not intended to limit the applicable environments. FIG. 19 illustrates one embodiment of a computer system suitable for use as the encoding and/or decoding system of FIG. 1. The computer system 1940 includes a processor 1950, memory 1955 and input/output capability 1960 coupled to a system bus 1965. The memory 1955 is configured to store instructions which, when executed by the processor 1950, perform the methods described herein. The memory 1955 may also store the compressed pixel data. System bus 1965 provides for the delivery and receipt of the compressed pixel data. Input/output 1960 also encompasses various types of computer-readable media, including any type of storage device that is accessible by the processor 1950. It will also be appreciated that the system 1940 is controlled by operating system software executing in memory 1955. Input/output and related media 1960 store the computer-executable instructions for the operating system and methods of the present invention. The encoder and decoder shown in FIGS. 17A and 17B may be separate components coupled to the processor 1950, or may be embodied in computer-executable instructions executed by the processor 1950. In one embodiment, the computer system 1940 may be part of, or coupled to, an ISP (Internet Service Provider) through input/output 1960 to transmit or receive the compressed pixel data over the Internet. It is readily apparent that the present invention is not limited to Internet access and Internet web-based sites; directly coupled and private networks are also contemplated. The description of FIG. 19 is intended to provide an overview of computer hardware and other operating components suitable for implementing the invention, but is not intended to limit the applicable environments. It will be appreciated that the computer system 1940 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Particular methods of the invention are described in terms of computer software with reference to a series of flow diagrams. The methods constitute computer programs made up of computer-executable instructions illustrated as blocks. Describing the methods by reference to a flow diagram enables one skilled in the art to develop such programs including such instructions to carry out the methods on suitably configured computers. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in the Figures without departing from the scope of the invention and that no particular order is implied by the arrangement of blocks shown and described herein.

A invention for compressing data has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized method comprising:
    performing, by a processor, a variable quantization upon luminance in a macroblock of video data;
    comparing the luminance to a result of the variable quantization to compute a variable noise;
    performing a fixed quantization upon the luminance;
    comparing the luminance to a result of the fixed quantization to compute a fixed noise;
    selecting the result of the variable quantization if the variable noise is less than or equal to the fixed noise;
    selecting the result of the fixed quantization if the variable noise is greater than the fixed noise; and
    transferring the selected result to a frame memory.

2. The computerized method of claim 1, further comprising forcing an intra mode coding decision if the noise corresponding to the selected result exceeds a threshold.

3. The computerized method of claim 1, wherein the performing the variable quantization comprises:
    initializing a current quantization mode;
    computing prediction data for all but a first pixel;
    computing quantization data for all but a first pixel;
    computing inverse quantization data for all but a first pixel; and
    assigning a new value to the current quantization mode when the inverse quantization data for a pixel exceeds a threshold.

4. The computerized method of claim 3, wherein the performing the variable quantization is restarted when the inverse quantization data for the pixel exceeds the threshold.

5. The computerized method of claim 1, further comprising:
    computing chrominance compression modes in accordance with the selected result;
    computing mode errors, wherein each mode error corresponds to one of the chrominance compression modes; and
    selecting a chrominance compression mode with a lowest mode error.

6. A non-transitory computer-readable storage medium storing instructions which when executed by a data processing system cause the data processing system to perform a method of processing data, the method comprising:
    performing a variable quantization upon luminance in a macroblock;
    comparing the luminance to a result of the variable quantization to compute a variable noise;

performing a fixed quantization upon the luminance;

comparing the luminance to a result of the fixed quantization to compute a fixed noise;

selecting the result of the variable quantization if the variable noise is less than or equal to the fixed noise;

selecting the result of the fixed quantization if the variable noise is greater than the fixed noise; and transferring the selected result to a frame memory.

7. The non-transitory computer-readable storage medium of claim 6, further comprising forcing an intra mode coding decision if the noise corresponding to the selected result exceeds a threshold.

8. The non-transitory computer-readable storage medium of claim 6, wherein the performing the variable quantization further comprises:

initializing a current quantization mode;

computing prediction data for all but a first pixel;

computing quantization data for all but a first pixel;

computing inverse quantization data for all but a first pixel; and assigning a new value to the current quantization mode when the inverse quantization data for a pixel exceeds a threshold.

9. The non-transitory computer-readable storage medium of claim 8, wherein the performing the variable quantization is restarted when the one or more of the plurality of inverse quantization data exceeds the threshold.

10. The non-transitory computer-readable storage medium of claim 6, further comprising:

computing chrominance compression modes in accordance with the selected result;

computing mode errors, wherein each mode error corresponds to one of the chrominance compression modes; and selecting a chrominance compression mode with a lowest mode error.

11. A system comprising:

a processor coupled to a bus;

a memory coupled to the processor through the bus;

a process executed by the processor from the memory to cause the processor to perform a variable quantization upon luminance in a macroblock, to compare the luminance to a result of the variable quantization to compute a variable noise, to perform a fixed quantization on the luminance, to compare the luminance to a result of the fixed quantization to compute a fixed noise, to select the result of the variable quantization where the variable noise is less than or equal to the fixed noise, to select the result of the fixed quantization where the variable noise is greater than the fixed noise, and to transfer the selected result to a frame memory.

12. The system of claim 11 wherein the process further causes the processor to force an intra mode coding decision if the noise corresponding to the selected result exceeds a threshold.

13. The system of claim 11 wherein the performing the variable quantization further comprises:

initializing a current quantization mode;

computing prediction data for all but a first pixel;

computing quantization data for all but a first pixel;

computing inverse quantization data for all but a first pixel; and assigning a new value to the current quantization mode when the inverse quantization data for a pixel exceeds a threshold.

14. The system of claim 13, wherein the performing the variable quantization further comprises restarting the variable quantization when the one or more of the plurality of inverse quantization data exceeds the threshold.

15. The system of claim 11 wherein the process further causes the processor to compute chrominance compression modes in accordance with the selected result, compute mode errors, wherein each mode error corresponds to one of the chrominance compression modes, and select a chrominance compression mode with a lowest mode error.

* * * * *